Patented Mar. 2, 1937

2,072,507

UNITED STATES PATENT OFFICE 2,072,507

BONDED ABRASIVE ARTICLE AND METHOD OF MANUFACTURING THE SAME

Osborne L. Mahlman, Kenmore, and Raymond C. Benner, Niagara Falls, N. Y., assignors, by mesne assignments, to The Carborundum Company, Niagara Falls, N. Y., a corporation of Delaware No Drawing. Application July 1, 1931, Serial No. 548,254

13 Claims. (Cl. 51—280)

This invention relates to an improvement in bonded abrasive articles and to a method of producing the same. The object of the invention is to make improved abrasive articles bonded with mixtures of rubber and heat hardenable resins.

As is well known in the art, both resin and rubber bonded articles possess properties which are valuable for specific purposes and unique in themselves. For example, there is practically no adhesion between abrasive grain and rubber while there is appreciable adhesion between abrasive grain and the resins used as bond. Another difference between the two classes of bonds is that rubber softens appreciably under the heat of grinding while resins do not. Since the method which is the subject of this application provides a means by which any ratio of resin to rubber can be secured, it is possible to make abrasive articles characterized by the properties of the combined bonds. Where the proportion of resin to rubber is high, there is little or no softening of the bond under the influence of heat while bond to grain adhesion is pronounced. Where rubber constitutes the major portion of the bond, its properties predominate and the bond softens under heat while there is little or no adhesion between bond and grain, the grain being held by "pocketing" in the continuous mass of rubber. Intermediate between these two extremes, an entirely new type of bond is produced which is like no other bond heretofore used.

One advantage of this process of making organic bonded abrasives of the above-mentioned type lies in the fact that, regardless of the proportion of resin to rubber, the bond is in an easily distributable condition and of a consistency similar to soft butter, in which the grain can be supported.

The old process of milling grain into compounded rubber has the serious disadvantage that it is impossible to control the size of the abrasive particles in the finished product since they are, to a greater or less extent, crushed in the mixing operation. The new bond, being plastic, avoids this difficulty and permits molding by methods similar to those used for ceramic, resin, and other plastic or plasticizable bonds.

An additional advantage of the new bond is that the finished article is more porous than one made by milling grain into compounded sheet rubber since the latter article consists, in effect, of a continuous mass of rubber filled with abrasive particles while the new process bonds by surrounding each grain with bond and then causing these bond coatings to adhere to each other on relatively small areas, leaving considerable pore space through the body of the article. The process by which these bonds are prepared will be made clear to one acquainted with the art from the considerations that follow.

Certain liquids, such as benzol or carbon tetrachloride, modify the properties of coagulated rubber, swelling it to form a jelly or "solution" as it is sometimes called. Other liquids such as alcohol or water, have no effect on rubber immersed in them but may be mechanically mixed with rubber by kneading "broken down" sheet rubber in the presence of the liquid; for example, in a dough mixer. The amount of liquid which can be mixed into rubber is, however, very small, amounting in the case of water, for example, to about 20%. The mixture of rubber and water is somewhat "shorter" than rubber alone but still decidedly tough. If kneading be continued beyond the limit of miscibility, however, the additional liquid simply stays in the bowl of the mixer and cannot be forced into the solid rubber-liquid mass.

Now we have discovered that certain liquids which are not ordinarily regarded as solvents of rubber are miscible with coagulated rubber to a much greater extent than any previously known. If, for example, a mass of sheet rubber be mixed with a liquid phenolic condensation product (commonly called an "A stage" resin) such as that sold to the trade as "Redmanol AR 540", it is possible to mix into the rubber as much as 2 parts resin to 1 part rubber whereas the limit of miscibility of water in rubber, as stated above, is only about 20% water based on the rubber content. Other liquids also exhibit this property as will be described later in this specification.

A mixture of resin and rubber in proportions corresponding to the limit of miscibility of rubber and water has much the appearance of a rubber-water mixture except for the brown color imparted by the resin as compared to the white appearance which is characteristic of rubber admixed with water. Further kneading in the presence of the resin results in the resin-rubber mixture becoming softer and shorter until finally, when conditions are properly adjusted as will be described later, the solid mass breaks up into very small particles and mixes with the liquid to form a paste.

One way of preparing these bonds, which we have found to be very convenient, is described below. It should be understood that the description is for illustrative purposes only, since other processes, as will be detailed later, may be used.

*Example 1.*—900 grams of coagulated rubber (such as that known as "smoked sheet") are "broken down" by any convenient process such as the successive passing of the rubber through a set of compounding rolls or, more conveniently for this purpose, in a dough-type mixer such as a "Baker-Perkins" mixer. The rubber mass is then subjected to prolonged working in a dough mixer, the jacket of which is maintained at a temperature of 85°–90° C., and to it is added a mixture of approximately equal parts water and a liquid or "A stage" phenolic condensation product such as that sold to the trade as "Redmanol AR 0014".

This "resin" is a reddish, viscous, oily liquid of about the consistency of molasses. It is miscible with water in all proportions from 0 to about 100 parts water per 100 parts resin. Its density at ordinary temperatures is about 1.16 grams per cubic centimeter. Chemical analysis shows that it contains up to about 12% free phenols but it gives no reaction for free aldehydes. It is presumed to be a mixture of the partial reaction product of a phenol and formaldehyde (or some substance which liberates formaldehyde such as hexamethylenetetramine or paraformaldehyde), a free phenol, and a "hardening agent" such as hexamethylenetetramine which decomposes to yield formaldehyde and ammonia under the influence of heat, the ammonia acting as a catalyst to promote the reaction between the phenol and the aldehyde, as a result of which the liquid, upon heating, first thickens and eventually hardens to the infusible and insoluble "C stage".

It will be found to be advisable, but not essential, to add the liquid rather slowly (say 2 or 3 cubic centimeters at a time) in the early stages of the process, since, if it be added too fast, the rubber tends to separate into balls which require prolonged working to combine. As the process continues, larger quantities of liquid can be added each time and the temperature can gradually be lowered to 30°–35° C. by the time the mixture consists of equal parts of rubber and liquid. The addition of liquid and the kneading are then continued until the proportion of liquid to rubber by weight is approximately 2 to 1. The rubber in the mixture is now very short and rather soft. The bowl of the mixer is then covered so that the temperature may be raised throughout the mix at the rate of about 3° C. per minute. As the temperature is increased, the mass becomes softer and shorter until finally, at about 90–100° C. it becomes fluid and can be poured. This final step is believed to bring about an inversion of the phases whereby the rubber, which was initially in the continuous phase, becomes dispersed in the resin containing liquid.

The resultant liquid appears, under the microscope, to consist of a substantially homogeneous mixture of the liquid and small particles of rubber. It is, however, unstable to the extent that, if left standing without agitation for about 24 hours or more, it will be found that a "cream" which is relatively high in rubber content (about 70 parts rubber to 30 parts resin) has risen on the mixture and can be skimmed off. This cream, which might be described more accurately as a butter, has the consistency of a thick paste and seems to consist of very finely divided rubber particles wet with the resin-water mixture. Upon washing with water, the resin can be removed whereupon the color changes from brown to cream or even white, depending upon the thoroughness with which the resin is removed.

If, instead of lowering the proportion of resin, it is desired to increase it, the paste can be mixed with more liquid resin as required.

Still another method of varying the proportion of rubber is to mix the rubber-resin-water liquid with natural latex or other dispersion of rubber in water.

It will be seen that by starting with this paste and either extracting with water to reduce the resin content or adding a dispersion of rubber in water, mixtures containing from 0 to 30% resin, based on the rubber plus resin, can be made. It is also possible, by adding more resin to the paste (either liquid or solid), to increase the resin content from 30% to practically 100% of the paste.

As an alternative method for making a mixture in which the ratio of resin to rubber is greater than unity, the following procedure can be followed.

*Example 2.*—Liquid resin is mixed into broken-down rubber at 100–120° Fahr. until the weight of liquid is from 1½ to 2 times that of the rubber, when the solid mass can be converted to a liquid by heating and mixing as before. If the proportion of rubber in this mixture is still too high, the resin content can be increased by the addition of more liquid resin (which is miscible with the resin-rubber liquid) or by mixing solid resin in the liquid. Or, if preferred, the additional resin can be added to the abrasive mix as will be described later.

Another process by which these mixtures can be made is as follows:

*Example 3.*—Into 900 parts of smoked sheet rubber, which has been broken down by any convenient means, mix 100 grams of a liquid resin such as that known by the trade name "Redmanol AR 0014". When the resin is all thoroughly mixed with rubber, the mass is appreciably softened. 60 grams of bentonite or other water-absorptive material are then added and thoroughly incorporated with the rubber-resin mixture. If the resin and bentonite addition has been made on rolls, the mass is then transferred to a dough type mixer, and the temperature of the mixer is adjusted to 130–140° Fahr. Water is then added while the mass is worked in the mixer until the weight of the mixture is increased to about 2,000 grams. The bowl of the mixer is then covered and the temperature of the jacket is raised at the rate of about 3° Fahr. per minute while working the mixture, until the previously solid mass softens and finally changes to a liquid. The temperature of the jacket is then lowered and the liquid is cooled to a moderate temperature when it can be removed and screened to remove any large pieces of rubber which it may contain.

The method of making an abrasive article with these bonds depends to some extent on the proportion of rubber to resin in the bond and upon the method by which the bond mixture was made. Abrasive articles ordinarily contain from about 4 to about 20% bond and these bonds are no different in this respect from others. As indications of how the process of making an abrasive article may be carried out, the following examples, which are for illustrative purposes only and are not intended to limit the invention, are cited.

A.—A homogeneous fluid mixture of 9 parts rubber, 1 part resin and about 10 parts of water is made as described above in Example 3. To 20 parts of this mixture is added 1 part magnesium oxide and 4.5 parts sulfur made into a paste with water. 90 parts of abrasive grain are then mixed with 0.9 part of a 10% solution of lead acetate in water and the bond mixture is then added and thoroughly mixed. The grain and bond mixture is then put into a pan and dried, for example, about 15 hours (over night) at about 150° Fahr. The dried mix, which is loosely bonded, is then disintegrated and screened through about an 8 mesh screen to remove any large lumps, pressed into the desired shape at, for example, about 3,000 pounds per square inch, and the pressed article is vulcanized or cured by heating to a temperature of about 320° Fahr. for about 12 hours. (This process is described more fully in a copending application, United States Serial No. 384,520 filed August 8, 1929).

B.—A mixture containing 30 parts rubber to 70 parts resin is prepared as described above in Example 2. 8 parts by weight of this mixture are then intimately mixed with 90 parts of abrasive grain and the wet mixture is "dried", with occasional stirring, at about 200° Fahr. until the resin thickens to the point that the mix is gummy and tacky. To this mixture is now added 3 parts of pulverized flint, 2 parts of a potentially reactive dry phenolic condensation product resin (such as that known by the trade name "Redmanol CR 0214") and 1½ parts of sulfur. The flint, "Redmanol" and sulfur, being dry powders, tend to reduce the tackiness of the mixture and at the same time are evenly and securely attached to the abrasive grains by the adhesiveness of the rubber resin bond. The mix is thus readily distributable and easy to mold. It is then molded, pressed at about 2,000 pounds per square inch, removed from the mold and cured at about 320° Fahr. for 12 hours.

C.—10 parts of a mixture containing 30 parts rubber to 70 parts resin are intimately mixed with 90 parts of abrasive grain and the mixture is "dried", as just described, until the mix becomes a suitable tacky consistency. It is then molded, pressed and cured as before. Since there is no vulcanizing agent added, this bond is relatively elastic, the soft rubber present in the body of resin serving to reduce the rigidity of the matured bond.

Certain metallic oxides are commonly used as fillers or compounding ingredients in the rubber industry. Some of these can be used to advantage in the rubber-resin bond while others have a deleterious effect on the resin. It has been found, for example, that magnesium oxide or ferric oxide, such as is sold for rubber compounding, have a beneficial effect on abrasives bonded with phenolic condensation product resins only as well as on those bonded with rubber-resin mixtures described above. Other fillers, which are apparently chemically inert toward resins, as for example pulverized flint or silicon carbide fines, are also beneficial for some applications as they apparently stiffen and strengthen the bond.

While we have given specific materials in the examples above, we do not mean to limit ourselves to either the materials or to the exact details of the processes cited. Where it is not intended that water shall be added, we may, for example, use, instead of the above-mentioned liquid, phenol condensation product resin (which is miscible with water), an "A stage" phenolic condensation product such as is known by the trade name "Durite #270" (a phenolic condensation product) or that known by the trade name "Redmanol AR 540" or a urea-formaldehyde resin in the liquid stage. As an alternative, we may dissolve a potentially reactive resin in a suitable solvent and mix this with the rubber as outlined in Example 2. Again, the kinds and amounts of fillers or compounding ingredients may be varied. Where an elastic bond is desired, the proportion of sulfur to rubber may be reduced or the sulfur may be entirely eliminated. Furthermore, the exact sequence of steps in the process need not be followed as, for instance, in Example 3, the bentonite may be added before, instead of after the resin or the resin and bentonite may be added alternately. Similarly, in Example 1, we may mix the resin and water and add this to the rubber or we may mix the rubber and resin and then add the water. Likewise for the processes of making the abrasive articles, the exact order of addition of the ingredients is immaterial although in most instances it is more convenient to follow the order as given.

The processes which we have described make it possible to construct a graduated series of abrasive articles which differ from one another according to the relative proportions of rubber and resin in the bond and in the proportion of bond to grain. For example, in one series of abrasive articles the grain sizes may be similar for each unit of the series; namely, silicon carbide grains which will pass through a twenty mesh screen but not through a twenty-four mesh screen. The bond may be five per cent by weight as compared with the weight of abrasive grains for each article of the series. The proportion of rubber in the bond may vary, however, from 0 to 100 per cent (the remainder being resin) from one article to another in the graduated series. The abrasive articles in which the bond is all rubber are characterized by the softening of the bond under the heat of grinding; that is, the bond has thermoplastic properties. The articles in which the bond is all resin are characterized by strong adhesion of the bond to the grain, which adhesion is not appreciably affected by the heat of grinding.

Another series of abrasive articles may be characterized by thirty mesh grains and eight per cent bond in the case of each member of the series, the composition of the bond varying from 100 per cent rubber and 0 per cent resin to 0 per cent rubber and 100 per cent resin.

Thus, a set of abrasive articles may be manufactured comprising a plurality of series such as have been described above. This enables the operator who possesses such a set of abrasive articles to select within close limits the kind of grinding action he desires.

We claim:

1. The process of manufacturing an abrasive article consisting in milling vulcanizable previously coagulated rubber and working in a liquid comprising a liquid phenolic condensation product resin, heating the mixture at a temperature below that which hardens the resin until the mixture becomes fluid, commingling abrasive grains with the fluid mixture, and producing a molded and hardened article from the commingled grains and mixture.

2. An abrasive article comprising abrasive grains and bond produced from a dispersion of vulcanizable previously coagulated rubber in liquid comprising a normally liquid resin.

3. An abrasive article comprising abrasive grains and bond formed by curing a dispersion of vulcanizable previously coagulated rubber in normally liquid resin.

4. The method of making an abrasive article which comprises forming a flowable dispersion of finely divided particles of vulcanizable, previously coagulated rubber in liquid comprising normally liquid resin, intimately mixing abrasive grains with the dispersion, and producing a molded and hardened article from the resulting mix.

5. The method of making an abrasive article which comprises forming a flowable dispersion of finely divided particles of vulcanizable, previously coagulated rubber in liquid containing normally liquid resin and water, intimately mixing abrasive grains with the dispersion, and producing a molded and hardened article from the resulting mix.

6. The method of making an abrasive article which comprises preparing a flowable dispersion of very finely divided particles of vulcanizable, previously coagulated rubber in liquid comprising normally liquid resin, intimately mixing abrasive grains and rubber with the said dispersion, and producing a molded and hardened article from the resulting mix.

7. The method of making an abrasive article which comprises forming a flowable dispersion of very finely divided particles of vulcanizable, previously coagulated rubber in liquid comprising normally liquid resin, intimately mixing abrasive grains and resin with the dispersion, and producing a molded and hardened article from the resulting mix.

8. The method of making an abrasive article which comprises forming a flowable dispersion of very finely divided particles of vulcanizable, previously coagulated rubber in liquid comprising normally liquid resin, intimately mixing abrasive grains and dry potentially reactive resin with the dispersion, and producing a molded and hardened article from the resulting mix.

9. A method of making an abrasive article which comprises producing a mass of very finely divided particles of vulcanizable rubber wet with liquid comprising normally liquid resin, intimately mixing abrasive grains with the mass of rubber particles, and producing a molded and hardened article from the resulting mix.

10. An abrasive article comprising abrasive grains and bond produced from a mass of very finely divided particles of vulcanizable rubber wet with liquid comprising a normally liquid resin.

11. The method of making an abrasive article which comprises forming a flowable dispersion of very finely divided particles of vulcanizable, previously-coagulated rubber in a normally liquid resin, intimately mixing abrasive grains with the said dispersion, and producing a molded and hardened abrasive article from the resulting mix.

12. The method of making an abrasive article which comprises forming a flowable dispersion of very finely divided particles of vulcanizable, previously-coagulated rubber in a normally liquid phenol condensation product resin, intimately mixing abrasive grains with the said dispersion, and producing a molded and hardened abrasive article from the resulting mix.

13. An abrasive article comprising abrasive grains and a bond formed by curing a dispersion of very finely divided particles of vulcanizable rubber in liquid comprising a normally liquid resin, said cured bond containing at least 50 per cent resin.

OSBORNE L. MAHLMAN.
RAYMOND C. BENNER.